United States Patent [19]

Bassett

[11] 4,339,891

[45] Jul. 20, 1982

[54] PLANT SUPPORTING AND WATERING DEVICE

[76] Inventor: Ronald M. Bassett, 2107 Summerdale Ave., Chicago, Ill. 60625

[21] Appl. No.: 194,554

[22] Filed: Oct. 6, 1980

[51] Int. Cl.³ .................. A01G 9/04; A01G 25/00
[52] U.S. Cl. ........................................ 47/71; 47/81
[58] Field of Search ............................ 47/79–81, 47/39, 66, 71

[56] References Cited

U.S. PATENT DOCUMENTS

| | | | |
|---|---|---|---|
| 3,975,860 | 8/1976 | Harned et al. | 47/81 |
| 4,218,847 | 8/1980 | Leroux | 47/59 |

FOREIGN PATENT DOCUMENTS

| | | | |
|---|---|---|---|
| 649568 | 10/1964 | Belgium | 47/81 |
| 1064281 | 8/1959 | Fed. Rep. of Germany | 47/81 |
| 579120 | 10/1924 | France | 47/81 |
| 465067 | 8/1951 | Italy | 47/81 |
| 291411 | 6/1953 | Switzerland | 47/81 |

*Primary Examiner*—James R. Feyrer
*Attorney, Agent, or Firm*—Samuel Kurlandsky

[57] ABSTRACT

A device for supporting a plant contained in a pot, and having a water reservoir and wick having a portion thereof retained in the water reservoir and a portion thereof extending into the soil of the pot.

3 Claims, 3 Drawing Figures

PLANT SUPPORTING AND WATERING DEVICE

BACKGROUND OF THE INVENTION

1. Field of the Invention

The present invention relates to devices for watering plants and more particularly refers to a device for supporting a pot containing a plant and having means for directing water into the soil contained in the pot.

2. Description of the Prior Art

For many years conventional devices have provided a system for watering plants retained in flower pots during periods when persons are not available to water the plants on a prescribed schedule. This takes place particularly when the persons who normally water the plants are on vacation. Many devices have been provided toward this end. However, none of the prior art devices have provided an inexpensive system for automatically watering a plant contained in a pot, which system is highly decorative and which can be used to support the flower pot.

SUMMARY OF THE INVENTION

It is an object of the present invention to provide a device for supporting a plant contained in a pot.

It is an additional object of the invention to provide such a support which is adapted to contain a reservoir of water, and which has means for automatically conveying water from the reservoir into the soil of the plant contained in the flower pot.

These and other objects, advantages and functions of the invention will be apparent upon reference to the specification and to the attached drawings illustrating preferred embodiments of the invention, in which like parts are identified by like reference symbols in each of the views.

According to the invention, a plant supporting and watering device is provided comprising a stand containing a water reservoir and means for mounting a potted plant thereon. Wick means is provided for drawing water from the reservoir into the soil contained in the pot. The amount of water which is brought into the pot is controlled so that the plant does not become overwatered.

DESCRIPTION OF THE PREFERRED EMBODIMENTS

Figure 1:
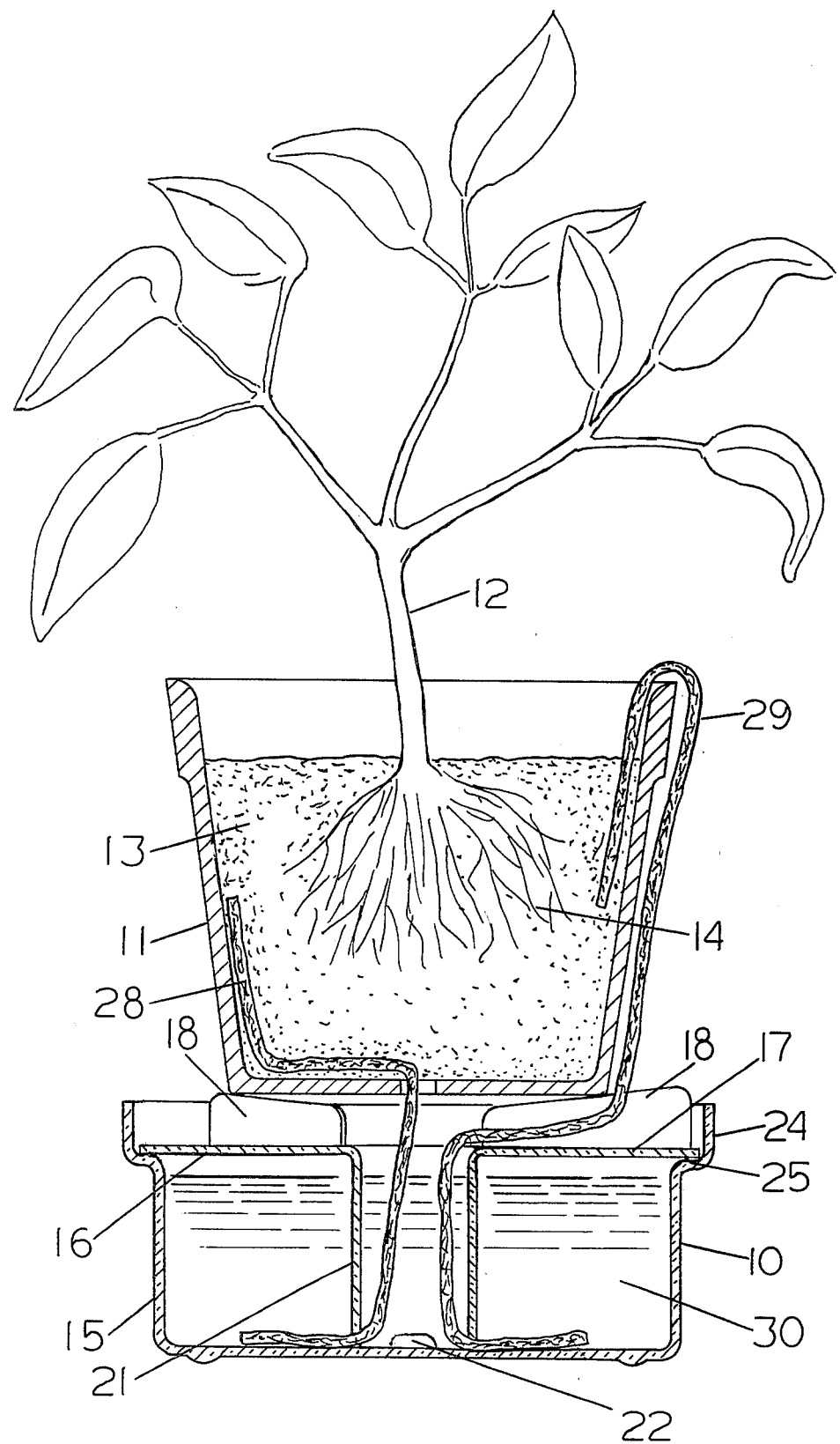
FIG. 1 is an elevational view, partly in cross-section illustrating the device of the invention supporting a pot containing a plant having roots embedded in the soil contained therein.
Figure 2:
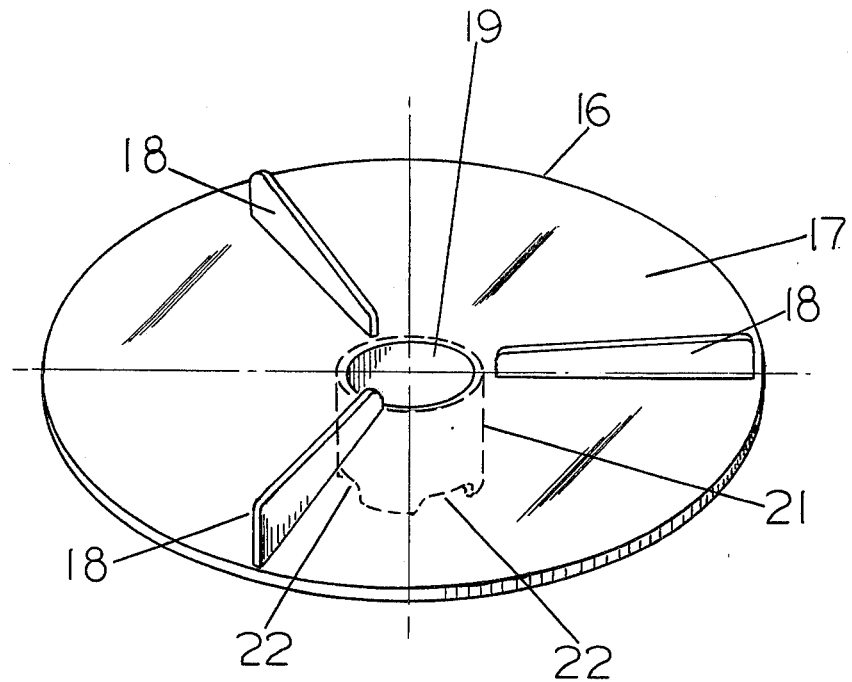
FIG. 2 is a perspective view of the supporting lid of the device.
Figure 3:
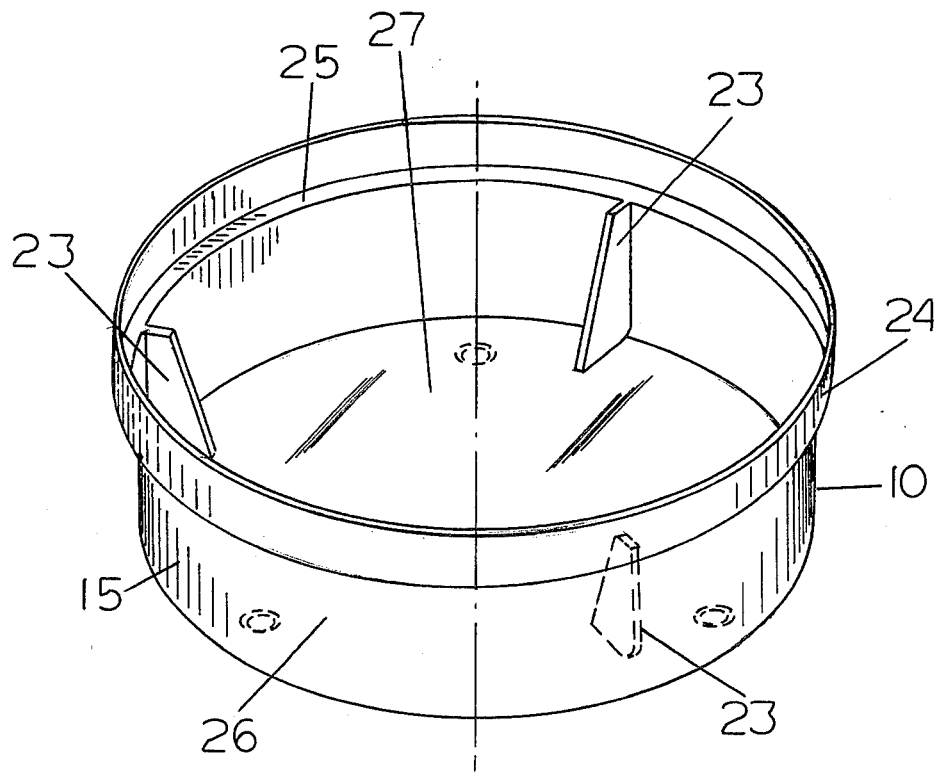
FIG. 3 is a perspective view of a water reservoir adapted to receive the supporting lid shown in FIG. 2.

Referring to FIGS. 1, 2 and 3, a potted plant supporting and watering device according to the invention is shown comprising a water reservoir stand 10 supporting a flower pot 11 containing a plant 12, and having soil 13 disposed therein in which roots 14 of the plant 12 are embedded. The water reservoir stand 10 comprises a container 15 adapted to contain water, having a cover 16 in the form of a disc 17 having ribs 18 radially mounted thereon. A tube 21 is mounted at the bottom of the disc 17 at an opening 19 provided in the center of the disc, and extends to the bottom of the water reservoir to hold down wicks which extend to the bottom of the reservoir. Slots 22 are provided at the lower lip of the tube 21 to permit the wicks to pass under the tube.

Referring particularly to FIG. 3, the container 15 is shown in detail and comprises an outer wall 26 and bottom 27. Gusset-shaped ribs 23 provide reinforcement between the outer wall 26 and the bottom 27. A flanged rim 24 is provided at the upper lip of the outer wall 26 and a shoulder 25 is provided on the flanged rim 24 cooperating therewith for supporting and retaining the disc 17.

Wicks 28 and 29 have a portion immersed in water 30 contained in the water reservoir stand 10. The wicks extend through the slot 22 of the tube 21 and through the tube 21 itself. In one embodiment, the wick 28 extends through a hole in the flower pot and is embedded in the soil along one side of the pot. In another embodiment a wick 29 also has its end in the water reservoir, extending through a notch 22, and upwardly along the side of the pot, bending over the upper lip of the pot, and extending along the inner side of the pot into the soil. Alternatively, both wicks may be used simultaneously.

The supporting and watering device of the present invention may be formed of metal or, alternatively, of relatively inexpensive plastic material such as polystyrene. If desired transparent polystyrene may be utilized so that the water level within the reservoir stand is visible at all times. Filling of the reservoir is accomplished by adding water between the top of the rim 24 and the pot. The two portions of the reservoir stand may be readily taken apart for cleaning when desired.

The supporting and watering device of the present invention has a number of advantages over prior art devices. First, a single design will accommodate a single design and dimensioned device can accommodate of various sizes. The device is inexpensive and strong and provides the desired amount of watering of the plant. The ribs of the cover not only act as stiffeners but also provide a tripod type surface for supporting the pot. The ribs also elevate the pot to provide room for placement of the wick and space for entry of water when refilling the reservoir.

The tube 21 affixed to the cover 16 projects downwardly toward the bottom of the reservoir. The slot 22 is provided to permit wicks to pass therethrough. The slots retain the wicks in the proper position and assure that the wicks are always held to the bottom of the reservoir. The bottom of the tube generally rests on the bottom of the reservoir in order to help sustain the weight of the plant. The tube also provides a path for entry of water through the wick for replenishing the reservoir.

It is to be understood that the invention is not to be limited to the exact details of construction or operation or materials shown and described as obvious modifications and equivalents will be apparent to one skilled in the art.

Invention is claimed as follows:

1. A supporting and watering device for a plant contained in a pot having soil therein, comprising:
   A. a water reservoir stand comprising a container adapted to contain water and having:
      1. an outer wall,
      2. a bottom, 3. a flanged rim at the upper edge of the outer wall defining a shoulder at the inner surface of said outer wall, and 4. a plurality of gussets affixed to the outer wall and bottom of said container for supporting said outer wall, and B. A disc-form cover positioned within said flanged rim and supported on said shoulder, said cover having radial ribs on the upper surface thereof for supporting said pot, and having a central aperture and a central tube vertically depending from said cover permitting a wick to pass through said tube and said cover, the lower lip of said tube being provided with recesses permitting said wick to pass thereunder and to be imbedded in the soil of the plant pot.

2. A supporting and watering device according to claim 1, having a plant contained in a pot supported on the cover thereof, water contained in said water reservoir, and a wick having one end immersed in said water and the other end passing below the recesses provided in said tube, through said tube and the aperature of said cover, through an aperature contained in the bottom of said pot, and disposed within the soil contained in said plant pot.

3. A supporting and watering device according to claim 1, having a potted plant supported on the cover thereof, water contained in said water reservoir, and a wick having one end immersed in said water and the other end passing below the recesses provided in said tube, through said tube and the aperature of said cover, and around the outer wall of said pot, wherein the wick has one end disposed in the water of said pot and the other end draped over the lip of said pot and disposed within the soil contained within said pot.

* * * * *